United States Patent

[11] 3,604,771

| [72] | Inventor | Steven O. Luzsicza |
| | | Huron, Ohio |
| [21] | Appl. No. | 882,842 |
| [22] | Filed | Dec. 8, 1969 |
| [45] | Patented | Sept. 14, 1971 |
| [73] | Assignee | Clevite Corporation |

[54] RESILIENT BEARING
7 Claims, 5 Drawing Figs.

[52] U.S. Cl. ..................................................... 308/238,
308/36.1
[51] Int. Cl. ....................................................... F16f 1/38,
F16c 33/20, F16c 27/00
[50] Field of Search ............................................ 308/238,
36.1, DIG. 7, DIG. 10; 18/30 UM

[56] References Cited
UNITED STATES PATENTS
3,107,953 10/1963 Palm ............................ 308/36.1
3,133,769 5/1964 Drake........................... 308/36.1
3,522,975 8/1970 White........................... 308/238

OTHER REFERENCES
Penney, D. L. and Bockhoff, F. J., " Fluidizing-Nylon Clad," Product Engineering March 3, 1958, Pg. 52– 54.

*Primary Examiner*—Martin P. Schwadron
*Assistant Examiner*—Barry Grossman
*Attorney*—Edward E. Sachs

ABSTRACT: A resilient bearing having an inner and an outer tubular member with a rubber bushing compressed therebetween. The rubber bushing has ribbed areas to permanently retain a lubricant. The outer member which faces the ribbed surface is encapsulated by a plastic liner which is shrunk in situ on the outer member to provide mechanical locking and a tight seal.

PATENTED SEP 14 1971

3,604,771

INVENTOR.
STEVEN O. LUZSICZA

BY Edward G. Sachs

ATTORNEY

RESILIENT BEARING

The invention relates generally to a resilient bearing and, more particularly, to a lubricated rubber bearing wherein the lubricant is permanently retained within the bearing.

The term "rubber" is to be understood to include natural rubber and synthetic rubberlike elastomers. The term "permanent" is to be understood to mean that the bearing is not subject to periodic lubrication. A bearing of this type is shown and described in U.S. Pat. No. 3,133,769, assigned to the same assignee as the present invention.

In resilient bearings of this type, a rubberlike bushing is interposed between two rigid tubular members with the rubber bushing being provided with lubricant-retaining grooves which are in contact with one of the metallic tubular members. In order to minimize the friction between the tubular member and the ribbed elastomeric surface of the bushing it has heretofore been proposed to coat the rigid contact surface with nickel or chrome or, in order to eliminate the relatively rough surface, to coat the same with a plastic.

However, it has been found that neither nickel nor chrome exhibit desirable frictional properties and the use of a plastic coating is at times uneconomical and therefore unsuitable for low-price mass production articles such as the present invention which is employed in automotive suspension systems.

One added factor which has to be taken into consideration is that in such automotive applications the bearings are exposed to weather conditions and salt solution and, therefore, those portions constituting the lubricant-retaining seals must be protected against corrosion as the salt and water have the tendency to penetrate into the bearing assembly which can ultimately destroy the usefulness of the device.

It is therefore the primary object of this invention to overcome the economical and technical shortcomings of the prior art concepts.

It is a more specific object of this invention to provide a relatively simple plastic liner which can be mechanically secured onto the tubular member without the need of expensive bonding agents.

It is a further object of this invention to provide a resilient bearing in which the plastic liner is shrunk in situ upon the tubular member to establish radial, as well as axial pressure upon certain surfaces of the tubular member in order to obtain axial end and circumferential seals against weather or other corrosive influences.

It is therefore another object of the present invention to provide a resilient bearing in which the tubular member facing the rigid bushing insert is sealed in a manner to significantly prolong the work life thereof.

An aspect of the present invention resides in the provision of a resilient bearing, for rotary motion, which is particularly adapted for automotive vehicle suspension systems. The bearing includes a rigid tubular inner member and a rigid tubular outer member concentrically disposed around or about the inner member. A load-transmitting rubberlike bushing is compressed between the members with one circumferential surface of the bushing being secured to the outside surface of the inner member and the other circumferential surface having lubricant retaining grooves facing the outer member. A layer of plastic material is shrunk in situ for encapsulating the inner circumferential surface of the outer tubular member which faces the lubricant-retaining grooves and the plastic layer also encapsulates the axial ends of the outer member.

For a better understanding of the present invention, together with other and further objects thereof, reference is had to the following description taken in connection with the accompanying drawings, and its scope will be pointed out in the appended claims.

Figure 1:
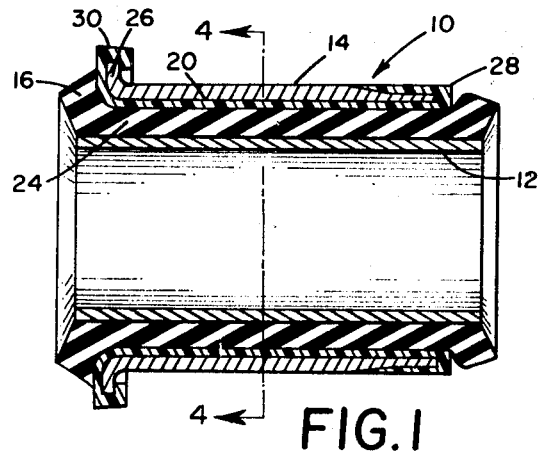
FIG. 1 is a longitudinal cross-sectional view of a resilient bearing in accordance with the present invention.

Turning now to the drawings, briefly, the resilient bearing is comprised of a rigid tubular inner member 12 and a concentrically arranged tubular outer member 14, both of which are composed of a rigid material suitable as a backing member, which usually is steel. A rubber bushing 16, also of tubular configuration, is mounted and compressed between the two concentric tubular members 12, 14 and the inner circumferential surface of the bushing is bonded or adhesively secured to the inner tubular member to prevent relative rotary motion therebetween. The other circumferential surface of the rubber bushing is provided with a plurality of lubricant-retaining grooves or ribs 18, see FIG. 5, which are in lubricated, load-bearing engagement with the bearing face 20 of the tubular member 14.

Figure 5:
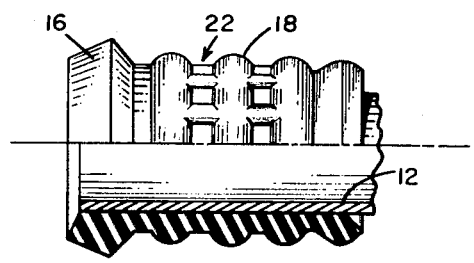
FIG. 5 is a view, partly in section, showing the configuration of the lubricant retaining grooves of the rubber bushing used in the bearing shown in FIG. 1.

The position of the lubricant-retaining grooves 18 and that of the bonding surface may be reversed, in which case the ribbed surface faces the inner tubular member 12 and the opposite circumferential area is bonded or secured to the surface 20 of the tubular outer member 14. Lubricant 22, not visible as such but indicated by the arrow in FIG. 5, is positioned between the ribs 18 to provide a permanently lubricated area of contact between the rubber bushing 16 and the outer member 14. The axial ends of the bearing, and more particularly that of the rubber bushing, are shaped in a manner to prevent the escape of the lubricant and to prevent dirt from infiltrating into the lubricated area. For a more detailed discussion and description of the bearing, reference may be had to the U.S. patent already noted above.

The improvement of the present invention pertains to the encapsulation of the outer member 14 (or alternatively the inner member 12) by a plastic liner 24. The plastic liner is molded onto and shrunk in situ upon the outer tubular member to encapsulate the inner circumferential surface 20 of the outer tubular member 14 which faces the lubricant-retaining grooves and ribs. Furthermore, the liner 24 encapsulates the axial ends of the outer member 14 in order to establish a fluid and particletight seal.

The need for bonding the liner 24 is obviated by the careful selection of a thermoplastic material which provides a sufficient degree of shrinkage during the curing process in order to establish the predetermined degree of mechanical locking and adhesion between the liner and the tubular member 14.

Preferably, the thermoplastic material is composed of polypropylene, although some other materials or mixed systems have shown some promise. Into the latter category fall thermosetting plastics of the type which establish the necessary degree of shrinkage during the in situ process. For examples, reference may be had to Machine Design, Plastics Book Issue, dated Sept. 20, 1962.

Figure 2:
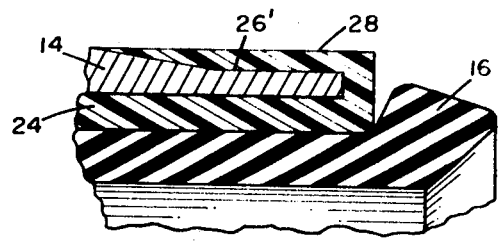
FIG. 2 is a fragmentary view similar to that shown in FIG. 1 illustrating an enlargement of one end section of the bearing.
Figure 3:
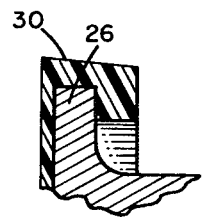
FIG. 3 is a fragmentary view similar to that shown in FIG. 1 illustrating an enlarged area of the flanged end of the bearing.

The plastic material, such as a polypropylene or nucleated polyamide, is molded onto the aforedescribed tubular outer member 14 by conventional molding methods. During the curing process, following the casting of the material, the encapsulant shrinks both longitudinally and circumferentially. The encapsulant or liner 24 encapsulates the flanged portion 26 in a manner so that the liner extends totally around the flange. The other end of the tubular outer member 14 is circumferentially recessed, see 26', FIG. 2, relative to the contiguous circumferential surface of the tubular outer member, and the layer 24 is imposed upon the recessed area to establish an outer surface in which the outside diameter of the tubular outer member is flush with the remaining surface of that member.

In the bearing depicted in FIG. 1, in view of the ratios of lengths to the diameter, shrinkage in the longitudinal direction causes a stress upon the end sections 28 and 30 of the plastic liner whereby a mechanically tight lock is established which simultaneously also provides fluidtight integrity in order to avoid liquids or dirt to penetrate between the liner 24 and the surface 20. It will be readily appreciated that the selection of a suitable coating thickness and overall length and shrinkage coefficient of the plastic will have a bearing on the degree of compression and anchorage.

To some extent the heat required to cause a thermoplastic material to melt or the exothermic reaction involved in thermosetting plastic, may be used to cause direct adhesion of the encapsulating material to the surface 20 of the tubular outer member 14. Such adhesion, however, is not essential to the operation of this invention.

Figure 4:
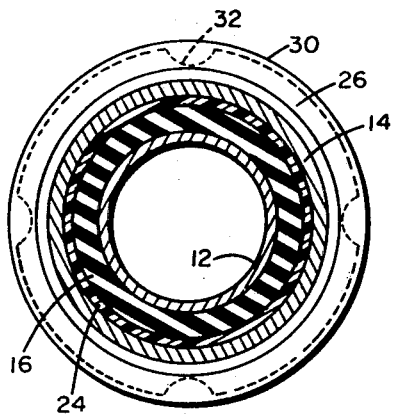
FIG. 4 is a cross-sectional view taken along line 4—4 of FIG. 1.

Referring now specifically to FIG. 4 there is shown that the radially flanged portion 26 of the tubular member 14 is notched, see 32, in several places along the periphery of the flange 26. During the molding of the layer 20 the plastic material fills the notches and thereby relative rotary movement is prevented between the outer tubular member and the encapsulating plastic liner 24.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. A resilient bearing, for rotary motion, particularly for vehicle suspension systems, comprising in combination: a rigid tubular inner member and a rigid tubular outer member concentrically disposed about the inner member; a load-transmitting rubberlike bushing compressed between said members, one circumferential surface of the bushing being secured to the outside surface of the inner member and the other circumferential surface having lubricant retaining grooves facing the outer member; a molded layer of plastic material shrunk in situ encapsulating the inner circumferential surface of the outer tubular member and having a nonuniform thickness formed on a portion of the outer surface of said outer member with a nonuniform thickness, said layer facing said lubricant-retaining grooves and also encapsulating the axial ends of the outer member.

2. A resilient bearing according to claim 1, wherein one axial end of the outer member is circumferentially recessed on the outer circumferential surface and said nonuniform layer is imposed upon the recessed area to establish an outer surface in which the outside diameter of the major portion of the outer member is the same as the corresponding diameter of the plastic layer.

3. A resilient bearing according to claim 1, wherein one axial end of the outer member is radially flanged and said encapsulation extends around the flange.

4. A resilient bearing according to claim 1, wherein said outer member is provided with mechanical retaining notches, and said plastic layer fills the notches to prevent relative rotary movement between the parts.

5. A resilient bearing according to claim 4, wherein said outer member is radially flanged at one axial end and said notches are located in the outer periphery of said flange.

6. A resilient bearing according to claim 1, wherein the shrinkage in situ is effective to establish a seal between the plastic layer and the outer member.

7. A resilient bearing, for rotary motion, particularly for vehicle suspension systems, comprising in combination: a rigid tubular inner member and a rigid tubular outer member concentrically disposed about the inner member; a load-transmitting rubberlike bushing compressed between said members, one circumferential surface of the bushing being secured to the outside surface of the inner member and the other circumferential surface having lubricant-retaining grooves facing the outer member; a layer of plastic material shrunk in situ encapsulating the inner circumferential surface of the outer tubular member facing said lubricant-retaining grooves and also encapsulating the axial ends of the outer member; one axial end of the other member being circumferentially recessed on the outer circumferential surface and said layer being imposed upon the recessed area to establish an outer surface in which the outside diameter of the major portion of the outer member is the same as the corresponding diameter of the plastic layer.